(12) United States Patent
Okamoto

(10) Patent No.: US 10,675,946 B2
(45) Date of Patent: Jun. 9, 2020

(54) VEHICLE AIR-CONDITIONING CONTROL DEVICE

(71) Applicant: DENSO CORPORATION, Kariya, Aichi-pref. (JP)

(72) Inventor: Tsuyoshi Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 15/541,075

(22) PCT Filed: Dec. 21, 2015

(86) PCT No.: PCT/JP2015/006353
§ 371 (c)(1),
(2) Date: Jun. 30, 2017

(87) PCT Pub. No.: WO2016/113810
PCT Pub. Date: Jul. 21, 2016

(65) Prior Publication Data
US 2017/0368911 A1 Dec. 28, 2017

(30) Foreign Application Priority Data
Jan. 13, 2015 (JP) ................................. 2015-004091

(51) Int. Cl.
*B60H 1/02* (2006.01)
*B60H 1/00* (2006.01)
(Continued)

(52) U.S. Cl.
CPC ............. *B60H 1/025* (2013.01); *B60H 1/004* (2013.01); *B60H 1/034* (2013.01); *B60H 1/143* (2013.01);
(Continued)

(58) Field of Classification Search
CPC .... B60H 1/2221; B60H 1/2218; B60H 1/004; B60H 1/034; B60H 2001/00128;
(Continued)

(56) References Cited

U.S. PATENT DOCUMENTS 8,666,583 B2\* 3/2014 Tashiro .............. B60H 1/00735
180/65.28
9,067,475 B1\* 6/2015 Jeong ................. B60H 1/00878
(Continued)

FOREIGN PATENT DOCUMENTS

JP 4893475 3/2012

OTHER PUBLICATIONS

International Search Report for PCT/JP2015/006353, dated Mar. 29, 2016, 4 pages.

*Primary Examiner* — Devon Russell
(74) *Attorney, Agent, or Firm* — Nixon & Vanderhye P.C.

(57) ABSTRACT

A vehicle includes an engine, a generator driven by the engine to generate an electric power, and a high-voltage battery charged with the electric power. An air heating in a vehicle interior is implemented by waste heat of the engine through which a heat medium is circulated and heated, and an air heating in the vehicle interior is implemented by a heat pump device consuming the electric power of the electric storage device. A hybrid ECU performs air conditioning control, and includes a determination device that determines whether to implement the air heating by the waste heat or the air heating by the heat pump device based on an engine body temperature, and a heating control device that selectively implements the air heating by the waste heat and the air heating by the heat pump device based on a determination result of the determination device.

11 Claims, 10 Drawing Sheets

(51) Int. Cl.
*B60H 1/22* (2006.01)
*B60H 1/03* (2006.01)
*B60H 1/14* (2006.01)

(52) U.S. Cl.
CPC ... *B60H 1/2221* (2013.01); *B60H 2001/2228* (2013.01); *B60H 2001/2237* (2013.01); *B60H 2001/2253* (2013.01); *B60H 2001/2259* (2013.01)

(58) Field of Classification Search
CPC .... B60H 2001/2237; B60H 2001/2228; B60H 2001/2253; F28F 2280/06; F28F 2215/14
See application file for complete search history.

(56) References Cited

U.S. PATENT DOCUMENTS

| | | | |
|---|---|---|---|
| 9,233,595 B2* | 1/2016 | Jeong | B60H 1/004 |
| 9,604,631 B2* | 3/2017 | Li | B60H 1/004 |
| 2005/0247446 A1* | 11/2005 | Gawthrop | B60H 1/004 |
| | | | 165/202 |
| 2010/0241341 A1* | 9/2010 | Yun | F02B 1/12 |
| | | | 701/113 |
| 2011/0109157 A1* | 5/2011 | Tani | B60H 1/00007 |
| | | | 307/9.1 |
| 2014/0109872 A1* | 4/2014 | Porras | F01P 7/165 |
| | | | 123/435 |
| 2015/0183296 A1* | 7/2015 | Ragazzi | B60H 1/03 |
| | | | 219/205 |
| 2016/0339900 A1 | 11/2016 | Li | |

\* cited by examiner ature acquired by the body temperature acquisition
VEHICLE AIR-CONDITIONING CONTROL DEVICE This application is the U.S. national phase of International Application No. PCT/JP2015/006353 filed on Dec. 21, 2015, which designated the U.S. and claims priority to Japanese Patent Application No. 2015-4091 filed on Jan. 13, 2015, the entire contents of each of which are hereby incorporated by reference.

CROSS REFERENCE TO RELATED APPLICATION

This application is based on and incorporates herein by reference Japanese Patent Application No. 2015-004091 filed on Jan. 13, 2015.

TECHNICAL FIELD

The present disclosure relates to a vehicle air-conditioning control device.

BACKGROUND ART

For example, a vehicle having an engine and an electric motor for driving has been known. In the vehicle, an engine coolant is heated by an electric heating device to lower a threshold of water temperature under which an engine is turned ON to meet a water temperature requirement for air heating. As a result, an engine stop frequency increases to improve a fuel economy.

In addition, in a technique disclosed in Patent Document 1, in a hybrid vehicle having a first heating system using an engine as a heat source and a second heating system using an electric energy of a battery as a heat source, one of the first heating system and the second heating system is selected to perform heating so as to minimize a consumption energy (fuel consumption) based on a travel request and a heating request.

PRIOR ART DOCUMENT

Patent Document

Patent Document 1: JP 4893475 B2

SUMMARY

In recent years, with the evolution of an engine shaft efficiency and an EV running ability, a shortage of heat for air heating has become more severe, resulting in a risk that mere selection of an optimal heating method according to the current travel request and heating request becomes insufficient.

Electric heating per se using an electric energy does not consume a fuel to generate the heater's heat, but the fuel is consumed for generating the electric energy. For that reason, it is difficult to select an optimal heating with only the driving request and the heating request. Also, in order to minimize the fuel consumption, there may be a need to consider an engine body and a heat storage state in an engine coolant which is a heat medium. From this viewpoint, there may be room for technical improvement.

The present disclosure has been made in view of the above circumstances, and a main object of the present disclosure is to provide a vehicle air-conditioning control device capable of efficiently implementing air heating in a vehicle compartment.

According to an aspect of the present disclosure, a vehicle air-conditioning control device is used for a vehicle. The vehicle includes an engine, a generator that is driven by the engine to generate an electric power, and an electric storage device that is charged with the electric power generated by the generator. An air heating in a vehicle interior is implemented by waste heat of the engine through which a heat medium is circulated and heated. An air heating in the vehicle interior is implemented by a heating device consuming the electric power of the electric storage device. The vehicle air-conditioning control device performs a control for air conditioning in the vehicle. The vehicle air-conditioning control device includes a body temperature acquisition device that acquires a body temperature of the engine, a determination device that determines whether to implement the air heating by the waste heat of the engine or the air heating by the heating device based on the body temperature acquired by the body temperature acquisition device, and a heating control device that selectively implements the air heating by the waste heat of the engine and the air heating by the heating device based on a determination result of the determination device.

When the body temperature of the engine changes, an amount of waste heat (cooling loss) of the engine changes to increase or decrease. Specifically, the higher the body temperature, the more the amount of waste heat increases. In other words, the amount of heat transferred from the engine body to the heat medium increases, which is advantageous in utilizing the engine waste heat. In addition to a fact that the engine body is relatively large in heat capacity (for example, large as compared with a heat medium such as the coolant), the engine body can recover and store the heat generated in not only the current operation but also the past operation. In this case, the amount of waste heat of the engine is grasped based on the body temperature of the engine, and the air heating by the waste heat of the engine or the air heating by the electric heating device are selectively implemented taking the amount of waste heat into consideration, thereby being capable of appropriately leveraging the waste heat of the engine for the air heating in the vehicle compartment. As a result, the air heating in the vehicle compartment can be efficiently implemented.

DESCRIPTION OF EMBODIMENTS

Figure 1:
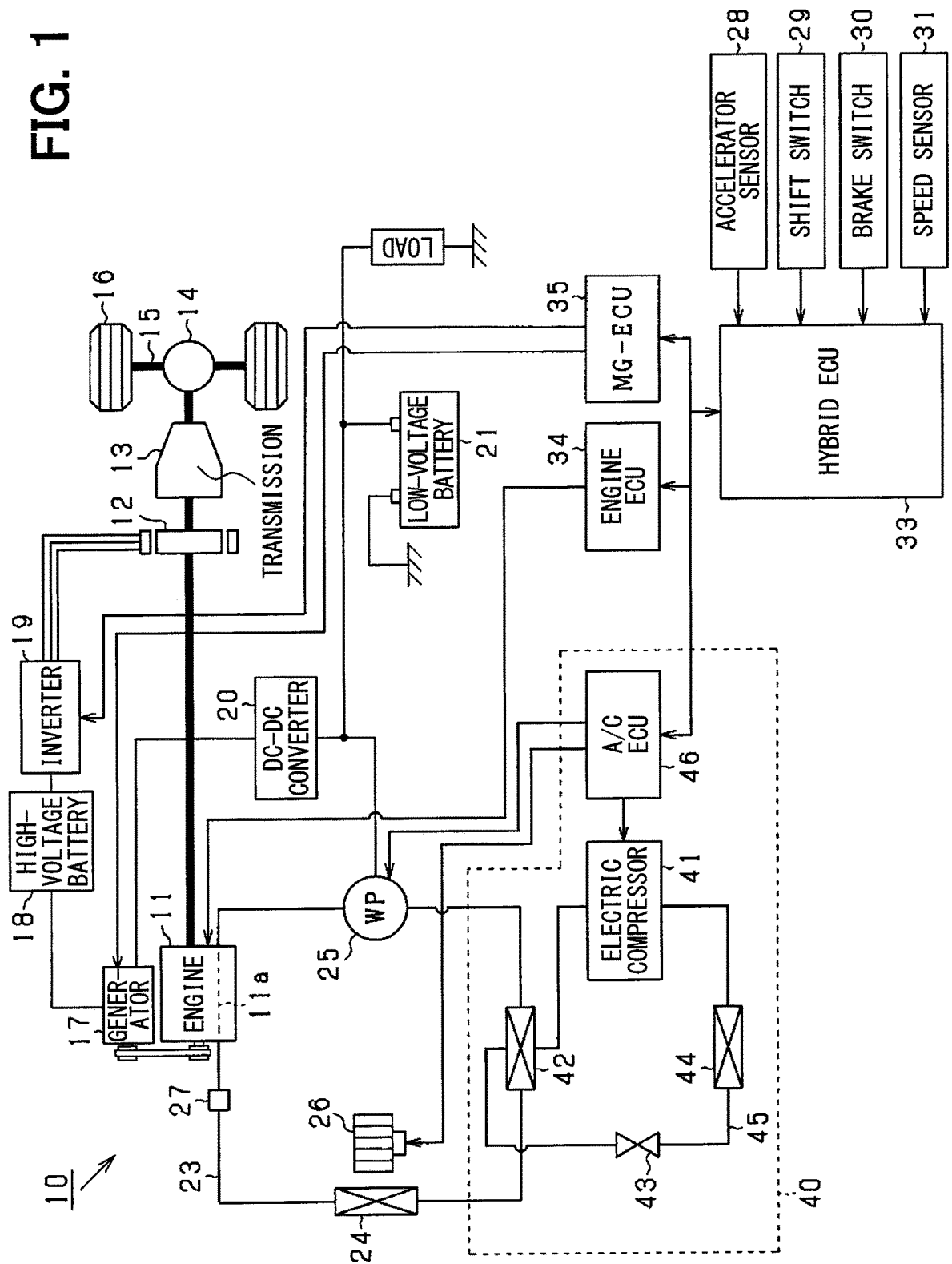
FIG. 1 is a schematic diagram illustrating a hybrid vehicle control system according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Hereinafter, an embodiment of the present disclosure will be described with reference to the drawings. In the present embodiment, in a hybrid vehicle including an engine (internal combustion engine) and a motor (electric motor) as a power source for driving a vehicle, a control system that implements various controls when the vehicle travels by the aid of one or both of the engine and the motor is embodied.

First, a schematic configuration of a hybrid vehicle control system will be described with reference to FIG. 1. A vehicle 10 is equipped with an engine 11 and a motor generator (hereinafter referred to as "MG") 12 as a power source. A power of an output shaft of the engine 11 is transmitted to a transmission 13 through the MG 12 and a power of the output shaft of the transmission 13 is transmitted to wheels 16 through a differential gear mechanism 14, an axle 15 and the like. The engine 11 is a gasoline engine or a diesel engine. The MG 12 functions as a running motor and a generator. The transmission 13 may be a stepped transmission that switches gears stepwise from among multiple gears, or may be a CVT (continuously variable transmission) that continuously changes gears.

A rotational shaft of the MG 12 is coupled between the engine 11 and the transmission 13 in a power transmission path that transmits the power of the engine 11 to the wheels 16 in a power transmittable manner. A clutch (not illustrated) may be provided between the engine 11 and the MG 12 (or between the MG 12 and the transmission 13) for connecting and disconnecting the power transmission.

The electric power that is generated by the generator 17 driven by the power of the engine 11 is charged in a high-voltage battery 18 (electric storage device). An inverter 19 for driving the MG 12 is connected to the high-voltage battery 18, and the MG 12 exchanges the electric power with the high-voltage battery 18 through the inverter 19. The generator 17 is connected to a low-voltage battery 21 through the DC-DC converter 20. Both of the high-voltage battery 18 and the low-voltage battery 21 are chargeable and dischargeable (chargeable and dischargeable) batteries.

The vehicle 10 has an EV mode, an engine mode, an HV mode, and the like as running modes. The EV mode is a mode in which the vehicle is allowed to travel by only the power of the MG 12 without the use of the power of the engine 11. The engine mode is a mode in which the vehicle is allowed to travel by only the power of the engine 11 and the HV mode is a mode in which the vehicle is allowed to travel while the MG 12 assists the power of the engine 11.

The engine 11 has an engine body configured by a cylinder block, a cylinder head and the like, and a water jacket 11a as a coolant passage for circulating a coolant as a heat medium is formed in the engine body. The water jacket 11a is connected with a coolant circuit 23 (circulation circuit) configured by a coolant pipe or the like. The coolant circuit 23 is provided with a heater core 24 as a heating device, an electric water pump 25 (electric pump), and a condenser 42 of a heat pump device 40 to be described later. The electric water pump 25 is driven by the electric power of the low-voltage battery 21, and the electric water pump 25 circulates a coolant (hot water) between the engine 11 and the heater core 24. A blower fan 26 for generating a hot air or a cold air is disposed in the vicinity of the heater core 24, and a heater heat of the heater core 24 is supplied to a vehicle compartment by driving the blower fan 26. A water temperature sensor 27 for detecting a temperature of the coolant is provided in the coolant circuit 23. A fluid other than the coolant, for example, a cooling oil can be used as the heat medium.

The electric heat pump device 40 is installed in the vehicle 10 as an air conditioning device. The heat pump device 40 includes an electric compressor 41 that compresses a low-temperature and low-pressure gas refrigerant into a high-temperature and high-pressure gas refrigerant, the condenser 42 (condenser) that discharges a heat from the high-temperature and high-pressure gas refrigerant to produce a high-pressure liquid refrigerant, an expansion valve 43 that decompresses and expands the high-pressure liquid refrigerant into a low-temperature and low-pressure liquid refrigerant, and an evaporator 44 (evaporator) that allows the low-temperature and low-pressure liquid refrigerant to absorb the heat into a low-temperature and low-pressure gas refrigerant. Those components are connected to each other by a refrigerant path 45. The electric compressor 41 is driven by a power supply from the high-voltage battery 18.

In addition, the heat pump device 40 includes an A/C ECU 46, and upon receiving a request for air conditioning, the air conditioner ECU 46 controls an inverter for the compressor (not shown) to drive the electric compressor 41.

When the heat pump device 40 is driven, that is, when a refrigerant circulates in the refrigerant path 45 by driving the electric compressor 41, the coolant flowing in the coolant circuit 23 can be heated by the heat released from the condenser 42. In that case, the coolant is heated by the condenser 42, as a result of which the vehicle compartment can be heated by the heater core 24.

In this case, the coolant flowing in the coolant circuit 23 is heated by the heat from the engine body, that is, a waste heat attributable to the combustion of the engine 11, and is also heated by driving of the heat pump device 40. Therefore, when heating of the vehicle compartment is required and the heat storage amount of the coolant does not satisfy the heating requirement, at least one of the heating of the coolant caused by the engine waste heat and the heating of the coolant caused by the heat pump device 40 is implemented.

An accelerator opening degree (the operation amount of an accelerator pedal) is detected by an accelerator sensor 28, and an operation position of a shift lever is detected by a shift switch 29. Further, the presence or absence of braking operation (or the brake operation amount by the brake sensor) is detected by a brake switch 30, and a vehicle speed is detected by a vehicle speed sensor 31.

The hybrid ECU 33 (vehicle air-conditioning control device) is an integrated control device that comprehensively controls the entire vehicle, and reads the output signals of the above-described various sensors and switches to detect an operation state of the vehicle. The hybrid ECU 33 is connected to other ECUs such as an engine ECU 34, an MG-ECU 35, and an A/C ECU 46 through a communication device such as a CAN, and the respective ECUs share various pieces of information such as control signals and data signals with each other. Each of those ECUs is mainly configured by a microcomputer including a CPU, a ROM, a RAM, and so on and executes various controls with the execution of various control programs stored in the ROM.

The engine ECU 34 is a control device that controls an operation state of the engine 11, and controls the fuel injection amount and the like. The MG-ECU 35 is a control device that controls the inverter 19 to control the MG 12 and also controls the generator 17. Further, the MG-ECU 35 calculates an SOC (the state of charge) indicative of a state of charge of the high-voltage battery 18 based on the measured value of a charge/discharge current of the high-voltage battery 18 which has been measured by the current sensor and a predetermined maximum capacity of the high-voltage battery 18. Specifically, the MG-ECU 35 calculates the SOC as a ratio to the maximum capacity of the battery while successively integrating the measured values of the current sensor. Further, the A/C ECU 46 is a control device that controls the air conditioning device for cooling and heating (the electric water pump 25, the blower fan 26, and the electric compressor 41).

The hybrid ECU 33 outputs command signals for controlling the engine 11, the MG 12, the generator 17, the air conditioning devices for cooling and heating (the electric water pump 25, the blower fan 26, the electric compressor 41) and the like to the other respective ECUs according to an operation state of the vehicle 10. The hybrid ECU 33 outputs a torque command value and a rotational speed command value to the engine ECU 34 and the MG-ECU 35, and outputs a heating request to the A/C ECU 46 in order to manage the traveling and energy of the vehicle.

Incidentally, when a body temperature of the engine 11 is changed, the waste heat amount (cooling loss) of the engine 11 changes to an increase side or a decrease side. Specifically, the waste heat amount increases more as the engine body temperature increases more. In other words, the amount of heat transferred from the engine body to the coolant increases, which is an advantageous situation when the heating in the vehicle compartment is to be implemented with the use of the engine waste heat. Moreover, in addition to the fact that the heat capacity of the engine body is relatively large (an engine thermal mass is larger than a coolant thermal mass), the heat generated in not only the current operation but also the past operation can be collected and stored.

Focusing on the above matter, in the present embodiment, the amount of waste heat of the engine 11 is grasped based on the engine body temperature indicative of the amount of heat stored in the engine body, and the heating by the waste heat of the engine 11 and the heating by the heat pump device 40 are selectively implemented taking the waste heat amount into consideration. In the present embodiment, the hybrid ECU 33 corresponds to a body temperature acquisition device, a determination device, and a heating control device.

Figure 2:
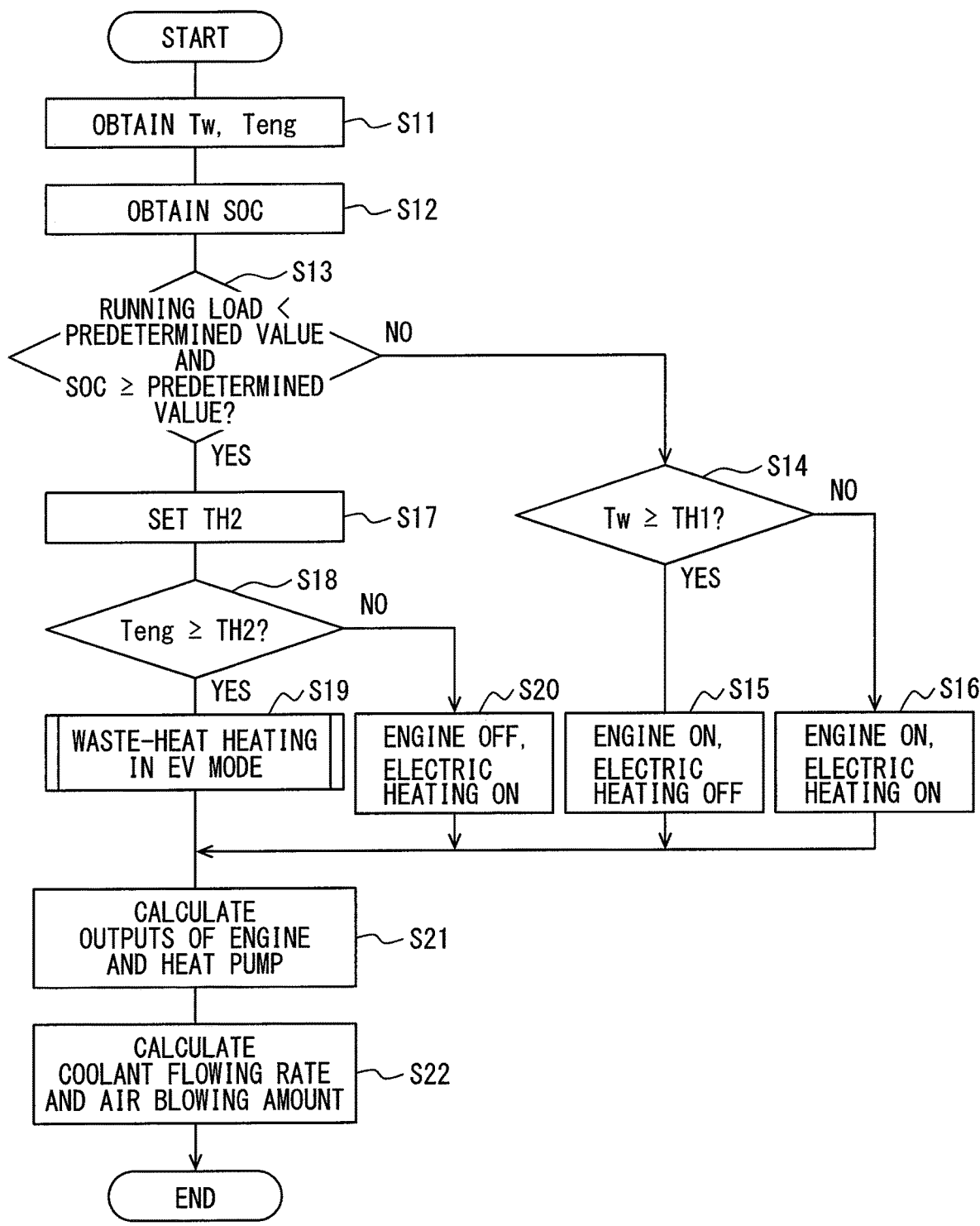
FIG. 2 is a flowchart illustrating a processing procedure of vehicle air conditioning control according to the first embodiment.

FIG. 2 is a flowchart illustrating a processing procedure of the vehicle air-conditioning control, and this processing is repeatedly executed by the hybrid ECU 33 at predetermined intervals. In this processing, it is assumed that each step is appropriately executed on the premise that a request for heating occurs.

Figure 3:
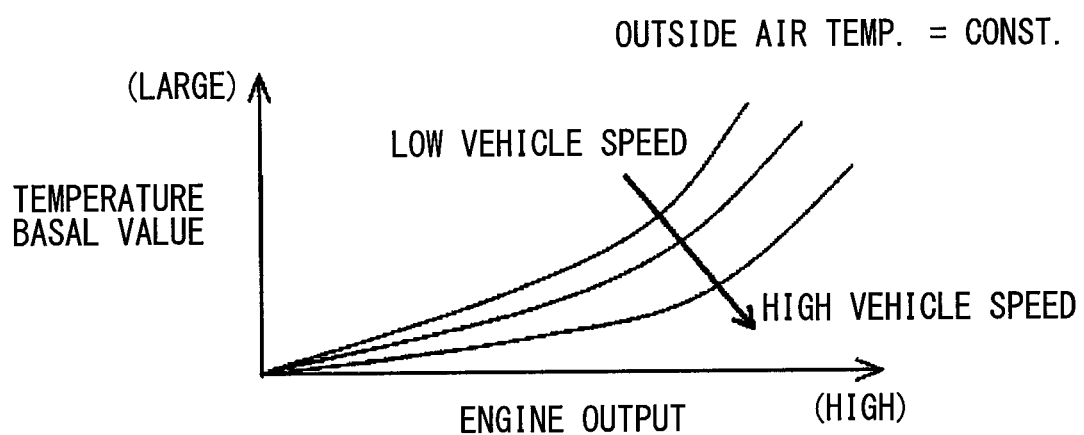
FIG. 3 is a diagram illustrating a relationship between an engine output, a vehicle speed, and a temperature basal value according to the first embodiment.
Figure 4:
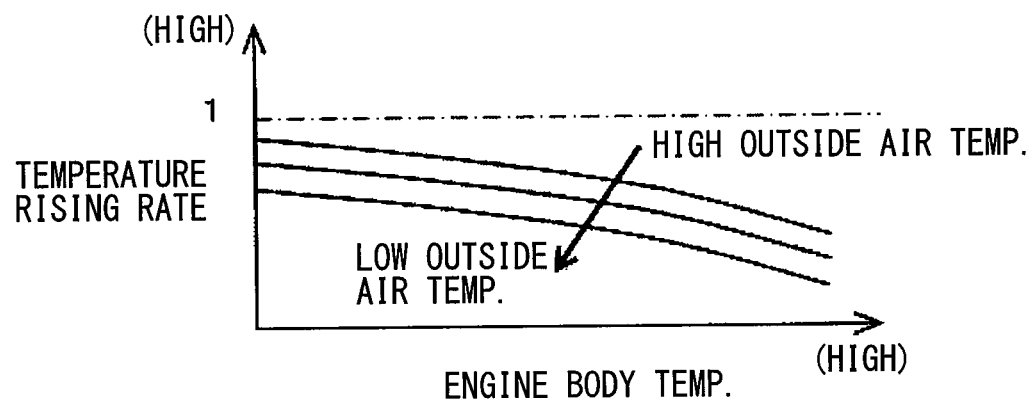
FIG. 4 is a diagram illustrating a relationship among an engine body temperature, an outside air temperature, and a temperature rising rate according to the first embodiment.

In FIG. 2, in Step S11, a water temperature Tw and an engine body temperature Teng are acquired, and in subsequent Step S12, the SOC of the high-voltage battery 18 is acquired. At this time, the water temperature Tw is a detection value detected by the water temperature sensor 27. The engine body temperature Teng is a temperature of the engine body configured by a cylinder block and the like and is calculated based on operation histories of the vehicle and the engine. For example, it is preferable to calculate the engine body temperature Teng based on changes in the engine output and the vehicle speed from the engine startup, an outside air temperature, and the like. More specifically, a basal value of the engine body temperature is calculated based on the engine output, the vehicle speed, and the outside air temperature with reference to a relationship illustrated in FIG. 3, and a temperature rising rate is calculated based on the engine body temperature and the outside air with reference to a relationship illustrated in FIG. 4. The engine body temperature Teng is calculated through the following relational expression.

$$Teng(t+1)=Teng(t)+\text{temperature basal value}\times\text{temperature rising rate}$$

A part of the hybrid ECU 33 that performs the control operation in step S11 may be used as an example of the body temperature acquisition device that acquires the engine body temperature Teng. Further, a part of the hybrid ECU 33 that performs the control operation in Step S11 may be used as an example of a medium temperature acquisition device that acquires a medium temperature.

Incidentally, it is also possible to calculate a cooling loss rate of the engine 11 and a heated rate of the coolant by the engine 11, and calculate the engine body temperature Teng based on those calculated rates. Alternatively, a temperature sensor may be attached to the engine body to acquire the engine body temperature Teng detected by the temperature sensor.

Thereafter, in Step S13, it is determined whether the vehicle 10 is in an EV running capable state, or not, that is, whether the running mode of the vehicle 10 is the EV mode, or not, based on a running load and the SOC. At that time, if the running load obtained from the accelerator opening degree or the like is equal to or more than a predetermined value or if the SOC is less than the predetermined value (if no in step S13), it is determined that the running mode is not the EV mode and the process proceeds to Step S14. If the running load is less than the predetermined value and the SOC of the high-voltage battery 18 is equal to or more than the predetermined value (yes in Step S13), it is determined that the running mode is the EV mode, and the process proceeds to Step S17. The fact that the determination in step S13 is no means a state in which the vehicle 10 travels by operating the engine 11 and the fact that the determination in step S13 is yes means a state in which the vehicle 10 travels by driving the MG 12 while the operation of the engine 11 is stopped.

In Step S14, it is determined whether the water temperature Tw is equal to or higher than a predetermined threshold TH1, or not. The threshold TH1 is a fixed value, for example TH1=40° C. If the determination in step S14 is yes (Tw≥TH1), the process proceeds to Step S15, in which the engine 11 is set to an operation state (on) as a process for securing the heater heat, and the electric heating by the heat pump device 40 is determined to turn off. At that time, only the engine waste-heat heating is used.

On the other hand, if the determination in Step S14 is no (Tw<TH1), the process proceeds to Step S16 in which the engine 11 is brought into the operation state (on) and the heat pump device 40 is determined to be electrically driven as a process for securing the heater heat. At that time, the engine waste-heat heating and the electric heating by the heat pump device 40 are used together.

On the other hand, in Step S17, a threshold TH2 for determining which of the heating (engine waste-heat heating) caused by the waste heat of the engine 11 and the heating (electric heating) caused by the heat pump device 40 is higher in efficiency is set. In the subsequent Step S18, it is determined whether the engine body temperature Teng is equal to or higher than the threshold TH2, or not. A part of the hybrid ECU 33 that performs the control operation in Step S18 may be used as an example of a determination device that determines whether to implement the heating by the waste heat of the engine or the heating by the heating device based on the body temperature acquired by the body temperature acquisition device.

If Teng≥TH2, it is determined that the waste-heat heating is more advantageous, and the process proceeds to Step S19. In Step S19, as a process for securing the heater heat, it is determined to implement the engine waste-heat heating by turning on the engine 11 even in the EV mode.

Steps S17 to S19 will now be described in detail. First, in Step S17, the threshold TH2 is variably set by using the fact that the engine body temperature Teng and the coolant heated rate according to the engine waste heat have a predetermined correlation, with reference to a value of the coolant heated rate which is on an equivalent level to an efficiency of the case where electric heating by the heat pump device 40 is implemented. More specifically, the COP (coefficient of performance) of the heat pump device 40 is calculated based on a rotational speed of the electric compressor 41, an inlet temperature of the condenser 42, an inlet flowing rate of the condenser 42, an outside air temperature and the like. Then, a COP equivalent value at the time of using the engine waste heat, which is equivalent to the calculated COP, is calculated. The coolant heated rate according to the engine waste heat is calculated according to a fact that a COP equivalent value X, a coolant heated rate Y caused by the engine waste heat, and a generating efficiency 2 have a relationship of "X=Y/Z" based on the COP calculation value and the power generating efficiency. The generating efficiency is calculated, for example, by multiplying the engine efficiency, the generator efficiency, and the inverter efficiency. Further, a threshold TH2 of the engine body temperature is calculated based on the coolant heated rate caused by the engine waste heat. A part of the hybrid ECU 33 that performs the control operation in Step S17 may be used as an example of a setting device that sets the first threshold (TH2) by using a relationship between the body temperature of the engine and a heated rate of the heat medium by the waste heat of the engine, with reference to a value of the heated rate which is on an equivalent level to an efficiency of the case where the air heating by the heating device is implemented.

Figure 5A:
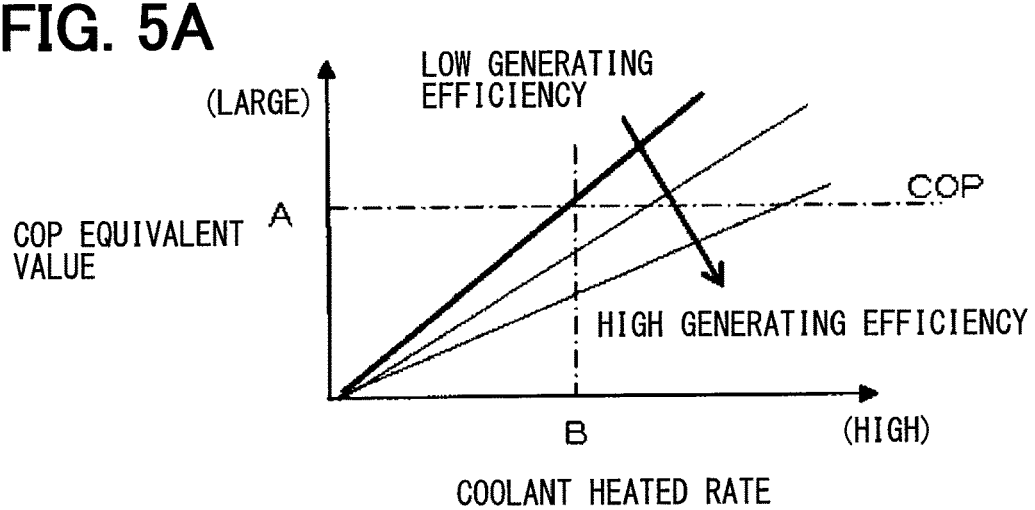
FIG. 5A is a diagram illustrating a relationship among a coolant heated rate, a generating efficiency, and a COP equivalent value according to the first embodiment.
Figure 5B:
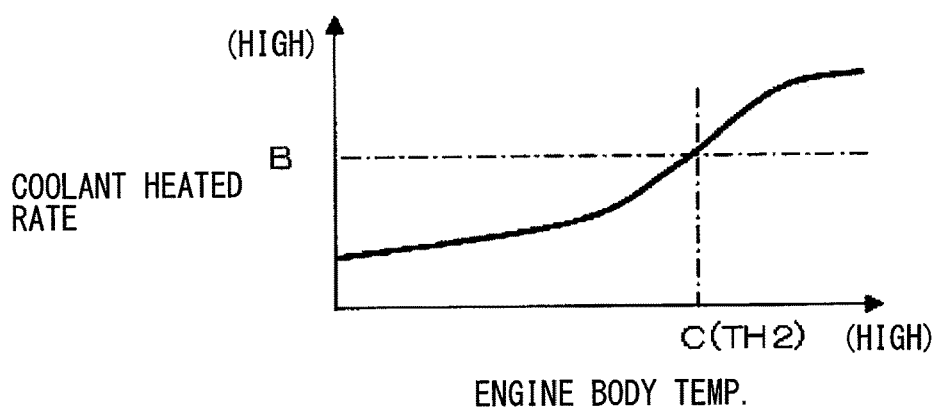
FIG. 5B is a diagram illustrating a relationship between an engine body temperature and a coolant heated rate according to the first embodiment.

The above configuration will be described with reference to FIGS. 5A and 5B. Symbol "A" in FIG. 5A is calculated as a COP equivalent value which is equivalent to that of the COP of the heat pump device 40 and the "B" in FIG. 5A is calculated as the coolant heated rate caused by the engine waste heat according to the calculated "A" and the generating efficiency. A symbol "C" is calculated from "B" as the engine body temperature threshold TH2 according to a relationship of FIG. 5B. In such a case, the threshold TH2 is set as the higher temperature value as the coolant heated rate caused by the engine waste heat is larger, in other words, the COP of the heat pump device 40 is larger. The threshold TH2 corresponds to the engine body temperature at which the coolant heated rate B can be achieved.

If Teng≥TH2 in Step S18, it is determined that the engine waste-heat heating is more efficient than the electric heating, and the process proceeds to Step S19.

Details of Step S19 will be described according to a subroutine illustrated in FIG. 6. In the subroutine illustrated in FIG. 6, in the case of turning on the engine 11 for the engine waste-heat heating in spite of the EV mode, it is selected to implement the operation of the engine 11 for the engine waste-heat heating after the EV running (MG drive) has been implemented, or implement the operation of the engine 11 for the engine waste-heat heating after the EV running (MG drive) has been stopped.

Figure 6:
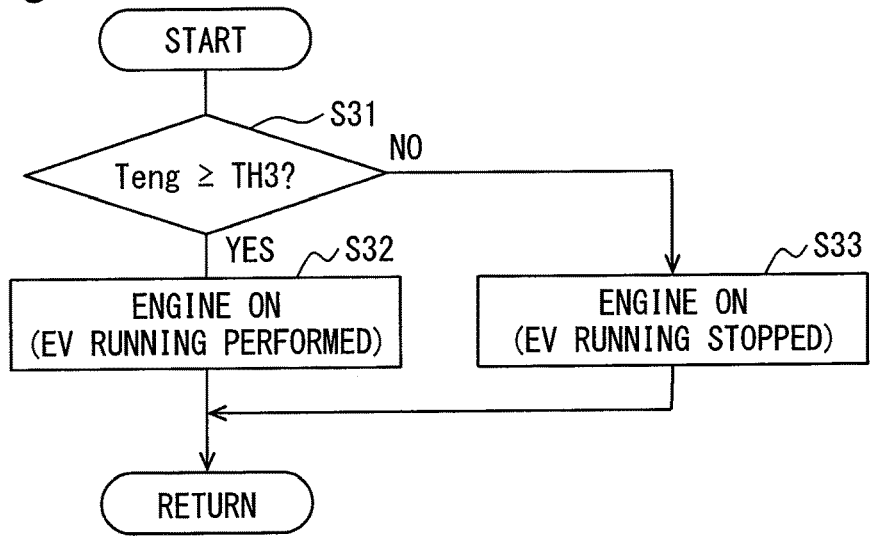
FIG. 6 is a flowchart illustrating a subroutine of FIG. 2.

In Step S31 of FIG. 6, it is determined whether the engine body temperature Teng is equal to or higher than a predetermined threshold TH3, or not. The threshold TH3 is a value higher than the threshold TH2 in Step S18 of FIG. 2. If Teng≥TH3, the process proceeds to Step S32, where it is determined to perform the engine operation for engine waste-heat heating after performing the EV running. At that time, the hybrid ECU 33 outputs a command to the engine ECU 34 for operating the engine 11 at constant speed under a predetermined high efficiency condition. For example, the hybrid ECU 33 outputs a command to operate the engine 11 in an idle state or a constant power generation state.

On the other hand, if Teng<TH3, the process proceeds to Step S33, where after the EV running has been stopped, it is determined to implement the engine operation for the engine running and the waste-heat heating. At that time, the hybrid ECU 33 outputs a command to the engine ECU 34 for operating the engine 11 to generate a power according to a running load each time.

It should be noted that a part of the hybrid ECU 33 that performs the control operation in Step S32 and Step S33 may be used as an example of a heating control device that selectively implements the heating by the waste heat of the engine and the heating by the heating device based on the determination result by the determination device. When a part of the hybrid ECU 33 that performs the control operation in Step S32 may be used as an example of a first control device that puts the electric motor into a driving state and implements the heating by the waste heat of the engine when it is determined to implement the heating by the waste heat of the engine during vehicle traveling in the EV mode. A part of the hybrid ECU 33 that performs the control operation in Step S33 may be used as an example of a second control device that puts the electric motor into a driving stop state and implements the heating by the waste heat of the engine when it is determined to implement the heating by the waste heat of the engine during the vehicle traveling in the EV mode. In addition, in Step S31, the efficiency of the coolant heating in Step S32 is compared with the efficiency of coolant heating in Step S33 based on the engine body temperature Teng. A part of the hybrid ECU 33 that performs the control operation in Step S31 may be used as an example of a switching device that compares the efficiency of the heat medium heating of the first control device with the efficiency of the heating medium heating of the second control device to select any control of the first control device and the second control device to be performed.

Returning to the description of FIG. 2, if Teng<TH2 in Step S18, it is considered that the electric heating is more advantageous than the engine waste-heat heating, and the process proceeds to Step S20. In Step S20, as a process for securing the heater heat, it is determined to turn off the operation of the engine 11 and turn on the electric heating by the heat pump device 40. At that time, only the electric heating by the heat pump device 40 is used.

After any of Steps S15, S16, S19, and S20 has been executed, the process proceeds to Step S21. In Step S21, command outputs of the engine 11 and the heat pump device 40 are calculated.

Figure 7:
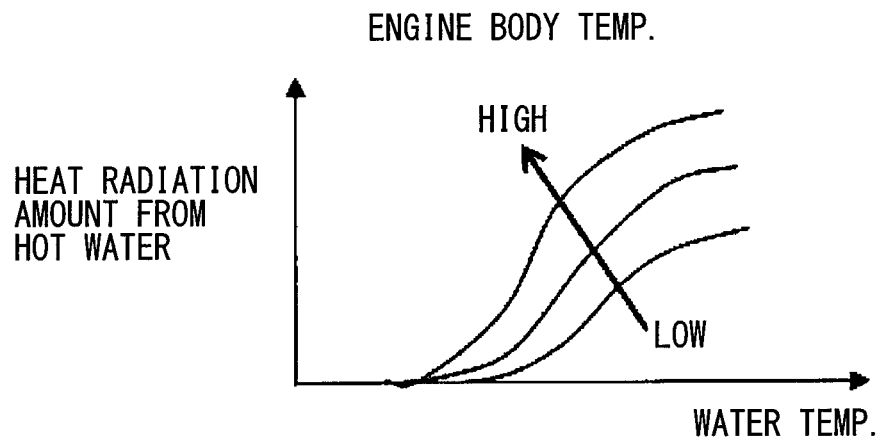
FIG. 7 is a diagram illustrating a relationship among a water temperature, the engine body temperature, and a heat radiation amount from hot water according to the first embodiment.

At that time, if only the engine waste-heat heating in the engine waste-heat heating and the electric heating by the heat pump device 40 is implemented, the engine command output is calculated based on the running requested output and the power generation requested output each time (engine command output=running requested output+power generation requested output). If only the electric heating by the heat pump device 40 is to be implemented, the heat pump command output is calculated based on the heating requested output and the heat radiation amount caused by the coolant circuit 23 (heat pump command output=heating requested output−heat radiation amount from hot water). The heat radiation amount from hot water corresponds to the heat amount that can be generated by driving the water pump, and is calculated based on, for example, a relationship in FIG. 7. When both of the engine waste-heat heating and the electric heating by the heat pump device 40 are performed, the heat pump command output is calculated based on the heating requested output, the heat radiation amount caused by the coolant circuit 23, and the engine heat generation amount (heat pump command output=heating requested output−heat radiation amount from hot water−engine heat generation amount).

Figure 8:
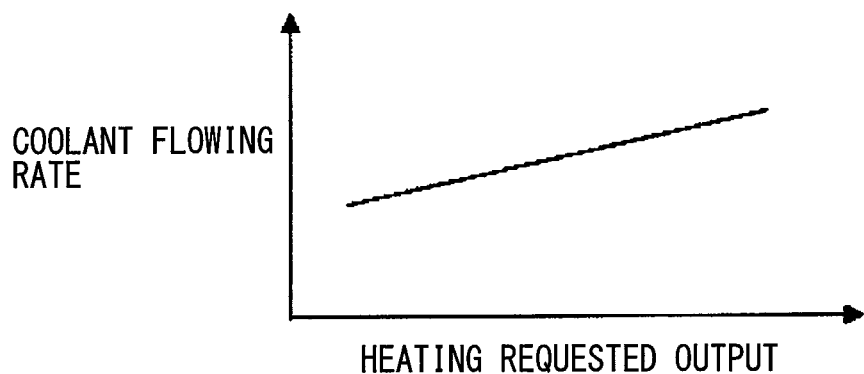
FIG. 8 is a diagram illustrating a relationship between a heating requested output and a coolant flowing rate according to the first embodiment.
Figure 9:
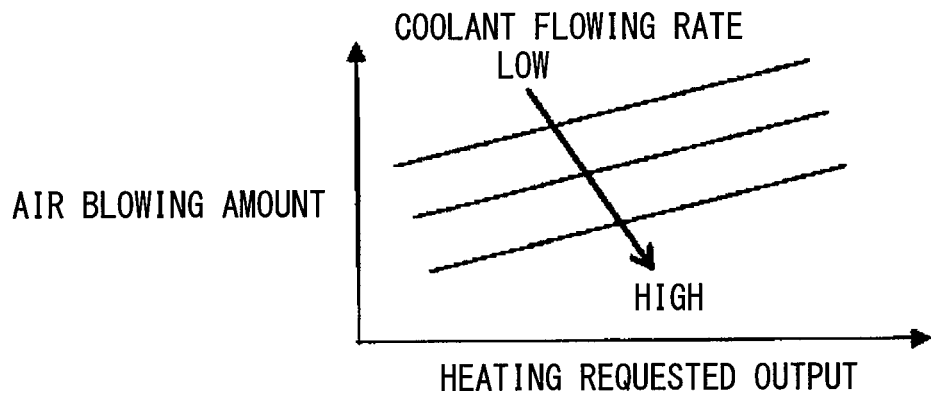
FIG. 9 is a diagram illustrating a relationship between the heating requested output, the coolant flowing rate, and an air blowing amount according to the first embodiment.

Thereafter, in Step S22, the coolant flowing rate by the electric water pump 25 and an air blowing amount by the blower fan 26 are determined so as to realize a desired heating requested output. Specifically, the coolant flowing rate is calculated according to a relationship of FIG. 8, and the air blowing amount is calculated according to a relationship of FIG. 9.

In FIG. 2, the following process may be implemented when the determination in Step S18 is yes. A process of determining a heating request water temperature that can be heated by only heat dissipation from the coolant circuit 23 driven by the water pump and determining whether a water temperature Tw is equal to or higher than a heating request water temperature, or not, and a process of turning off both of the engine 11 and the heat pump device 40 when the water pump Tw is equal to or higher than the heating request water temperature are implemented. Further, a process of determining whether the water temperature Tw is lower than a predetermined low temperature determination value (for example, 40° C.), or not and a process of turning on both of the engine 11 and the heat pump device 40 when the water temperature Tw is lower than the low temperature determination value are implemented.

Figure 10:
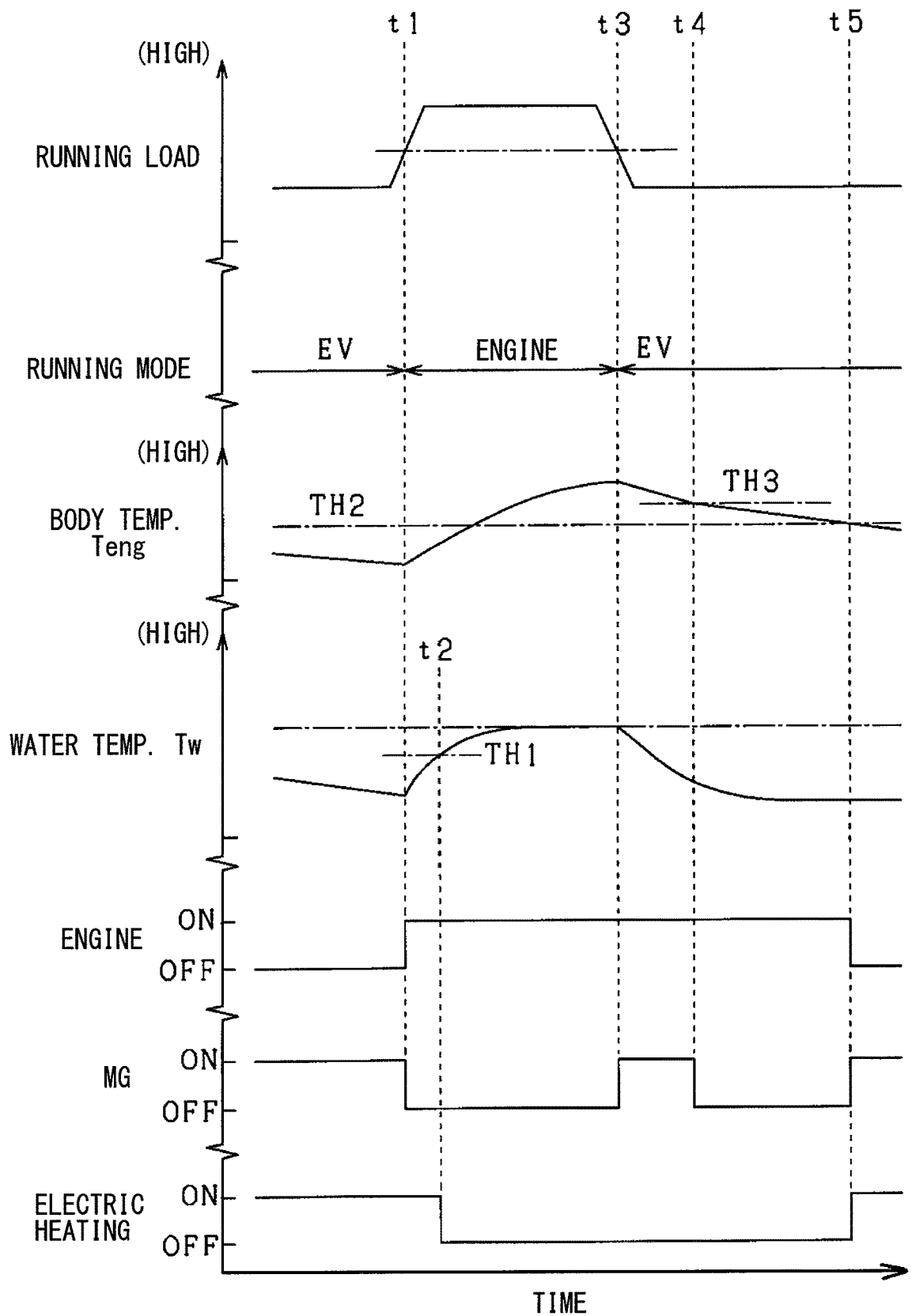
FIG. 10 is a time chart for illustrating an air conditioning control process according to the first embodiment.

FIG. 10 is a time chart for more specifically illustrating the above air conditioning control process. In FIG. 10, it is assumed that the heating request is generated through a period shown and the electric water pump 25 is in the driving state. Further, it is assumed that the SOC of the high-voltage battery 18 is relatively large. An increase and a decrease in the running load correspond to an increase and a decrease in an accelerator opening degree and a vehicle speed.

In FIG. 10, before a timing t1, the running load is relatively small, and the vehicle 10 is running in the EV mode. At that time, the electric heating by the heat pump device 40 is implemented in a state in which the engine body temperature Teng is less than the threshold value TH2 and the engine 11 is turned off.

With an increase in the running load, at the timing t1, the vehicle running mode shifts to a mode other than the EV mode (for example, the engine mode). In that case, the driving of the MG 12 is stopped, and the operation of the engine 11 is started as the driving power source of the vehicle 10. After the timing t1, the engine body temperature Teng and the water temperature Tw increase. Since the water temperature Tw is lower than the threshold TH1 after the timing t1 and before a timing t2, the engine is turned on and the electric heating is turned on. After the timing t2 at which the water temperature Tw is equal to or higher than the threshold TH1, the engine is turned on and the electric heating is turned off.

Thereafter, with a decrease in the running load, the vehicle running mode is again set to the EV mode at a timing t3. At that time, since the engine body temperature Teng is equal to or higher than the threshold value TH3 at the timing t3, after the EV running (MG driving) has been implemented, the engine operation is implemented for the engine waste-heat heating. In other words, because the engine waste-heat heating is implemented, the electric heating by the heat pump device 40 is not executed.

After the timing t3, the engine body temperature Teng and the water temperature Tw gradually decrease according to the operation state of the engine 11 and the like. However, at that time, due to a difference in thermal mass (heat capacity) between the engine body and the coolant circuit 23, the water temperature Tw decreases earlier than the engine body temperature Teng when the temperature decreases.

Thereafter, at a timing t4, the engine body temperature Teng becomes lower than the threshold value TH3. Therefore, while in the EV mode, the engine operation is performed after stopping the EV running. At that time, traveling of the vehicle 10 and heating of the vehicle compartment are implemented by driving the engine.

Thereafter, at a timing t5, the engine body temperature Teng becomes lower than the threshold value TH2. For that reason, the driving power source of the vehicle 10 is switched from the engine 11 to the MG 12. After the timing t5, the electric heating is implemented instead of the engine waste-heat heating.

According to the present embodiment described above in detail, the following excellent advantages can be obtained. In the engine 11, the waste heat amount (cooling loss) increases more as the body temperature increases more, which is advantageous in leveraging the engine waste heat. In this viewpoint, the engine waste heat amount is grasped based on the engine body temperature and the engine waste-heat heating and the electric heating are selectively implemented taking the waste heat amount into consideration, thereby being capable of appropriately leveraging the waste heat of the engine 11 for heating in the vehicle compartment. In other words, the heat stored in the engine body can be effectively leveraged for the heating in the vehicle compartment without being wastefully released to an atmosphere. For that reason, the output of the heat pump device 40 (electric heating device) which is a paid heat source can be minimized. As a result, the heating in the vehicle compartment can be efficiently implemented.

With the use of a fact that the engine body temperature Teng and the coolant heated rate caused by the engine waste heat have a predetermined correlation (a relationship of FIG. 5B), the threshold value TH2 (first threshold value) for determining which of the engine waste-heat heating and the electric heating by the heat pump device 40 is highly efficient is set on the basis of the coolant heated rate which is on an equivalent level to an efficiency of the case where the electric heating by the heat pump device 40 is implemented. In this case, the threshold value TH2 can be appropriately set while taking the efficiency (COP) in the heat pump device 40 into consideration, and consequently the determination of whether to implement the engine waste-heat heating, or not can be appropriately implemented.

In this case, the COP equivalent value at the time of using the engine waste heat is calculated so as to be equivalent to the COP of the heat pump device 40, and the coolant heated rate caused by the engine waste heat is calculated with the use of the calculated COP value. For that reason, advantages and disadvantages can be compared between the engine waste-heat heating and the electric heating after adjusting an indicator, thereby being capable of realizing appropriate switching between the engine waste-heat heating and the electric heating.

Even in the case where the vehicle running mode is the EV mode (in the case of low and middle running loads and the high SOC), it is conceivable that a fuel economy is improved by daring to put the engine 11 into the operation state depending on the engine body temperature, in other words, the fuel efficiency is improved by performing the engine waste-heat heating. Taking this matter into consideration, it is conceivable that the fuel economy can be improved by taking the heat storage state (heat storage) of the engine body into consideration.

In the case where the engine 11 is put into the operation state and the engine waste-heat heating is performed while the vehicle running mode is the EV mode, the engine waste-heat heating is implemented with the EV running (MG drive) state or the engine waste-heat heating is executed with the stop of the EV running (MG driving) is selected. In particular, if the engine body temperature Teng is equal to or higher than the threshold TH3 (the second threshold value), the engine waste-heat heating is implemented with the EV running state. If the engine body temperature Teng is lower than the threshold TH3, the engine waste-heat heating is implemented with the stop of the EV running. In that case, the engine waste-heat heating in the above two states can be appropriately implemented according to a required amount of the engine waste heat.

In the case where the engine waste-heat heating is implemented with the EV running state, the engine 11 is operated at constant speed (for example, in an idle state) with a predetermined high efficiency condition. In the case where the engine waste-heat heating is implemented with the stop of the EV running, the engine 11 is operated to generate the power in accordance with the running load. Accordingly, in the former case, the minimum necessary amount of waste heat is generated so as to implement the engine waste-heat heating. In the latter case, the fuel consumption can be integrated in only the engine 11 by performing the vehicle traveling and the waste-heat heating by the operation of the engine 11. In any case, the fuel consumption can be reduced.

If the vehicle 10 is in the EV running capable state and in the EV mode, the engine waste-heat heating and the electric heating are selectively implemented based on the engine body temperature Teng. If the vehicle 10 is not in the EV mode, after the engine waste-heat heating has been implemented, it is configured to switch whether to perform the electric heating, or not, based on the water temperature Tw. In that case, even if the vehicle 10 travels in any mode, appropriate heating in the vehicle compartment can be performed.

Hereinafter, another embodiment in which a part of the first embodiment is changed will be described. Note that the same reference numerals are given to the same configurations as those of the first embodiment, and their description will be simplified.

Second Embodiment

In the present embodiment, in the case of executing an engine waste-heat heating, in addition to a fact that an engine body temperature Teng is higher than a second threshold (TH3), a water temperature Tw is higher than a predetermined third threshold (TH4). In that case, after an EV running (MG driving) has been implemented, the operation of the engine 11 is implemented for the engine waste-heat heating.

Figure 11:
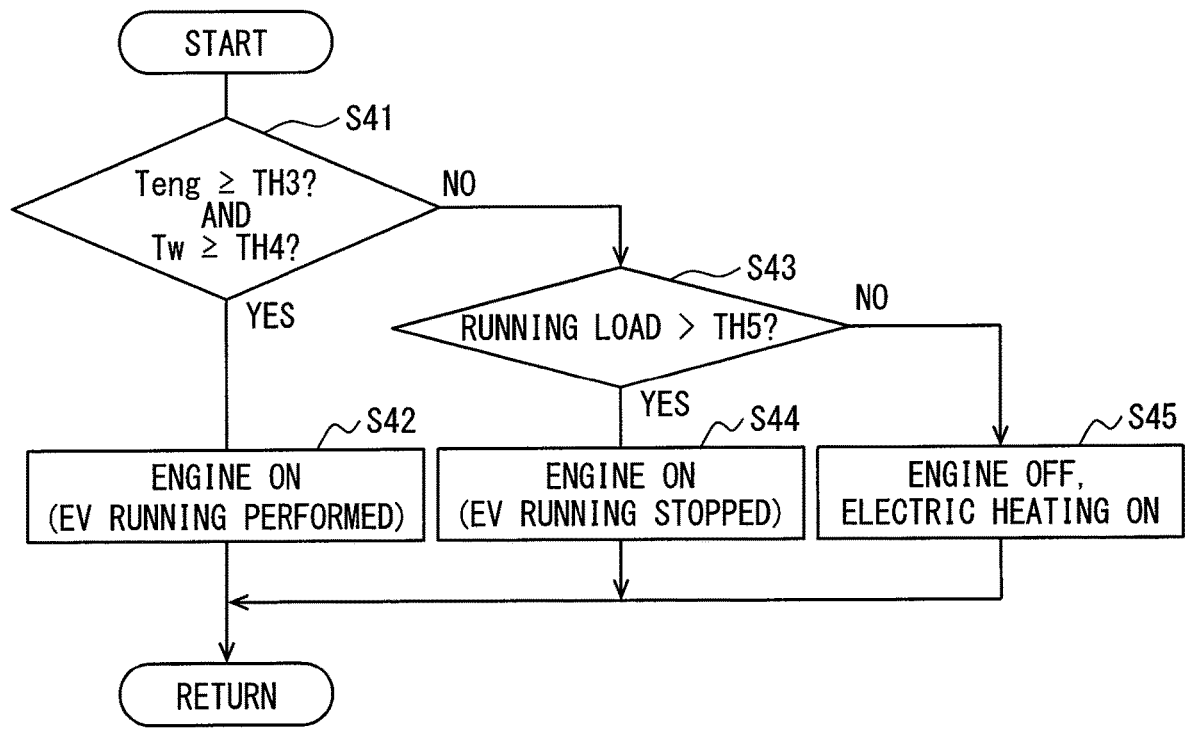
FIG. 11 is a flowchart illustrating a procedure of a waste-heat heating process in an EV mode according to a second embodiment of the present disclosure.

FIG. 11 is a flowchart illustrating a procedure of a waste-heat heating process in an EV mode. This process is executed by a hybrid ECU 33 in place of the process of FIG. 6 described above. In other words, FIG. 11 illustrates a process to be executed when a vehicle running mode is the EV mode in FIG. 2 and the engine body temperature Teng is determined to be TH2 or more (yes in both of Steps S13 and S18).

In FIG. 11, in Step S41, it is determined whether the engine body temperature Teng is equal to or higher than the predetermined threshold TH3 and the water temperature Tw is equal to or higher than the predetermined threshold TH4, or not. If the determination in step S41 is yes, the process proceeds to Step S42. If the determination in step S41 is no, the process proceeds to Step S43. In Step S42, after the EV running has been implemented, it is determined to implement the engine operation for the engine waste-heat heating. At that time, the engine 11 is operated, for example, in an idle state.

In Step S43, it is determined whether the running load of the vehicle 10 is larger than a predetermined threshold TH5, or not. The threshold TH5 is smaller than the load determination value in Step S13 of FIG. 2, for example, when the running load is about a medium load, the determination in Step S43 is yes, and when the running load is about a low load, the determination in step S43 is no.

If the determination in Step S43 is yes, the process proceeds to Step S44, where after the EV running has been stopped, it is determined to implement the engine operation for the engine running and the waste-heat heating. At this time, the engine 11 is operated in a state of generating a power according to the running load each time. On the other hand, if the determination in step S43 is no, the process proceeds to Step S45, in which the operation of the engine 11 is stopped, and it is determined to perform the electric heating by the heat pump device 40.

If the water temperature Tw is high, the heater heat can be secured at that point, but if the heat storage of the coolant is used too much in a state where the engine is kept off, forcible operation of the engine 11 is required, resulting in a risk that a fuel economy is reduced. In this respect, in the above configuration, when the engine body temperature Teng is high (Teng≥TH3), even though the water temperature Tw is high (Tw≥TH4), because the engine 11 is intentionally put into the operation state, the engine waste heat amount can be increased. As a result, a required amount of heating heat can be supplied with a smaller amount of fuel than that in the case of using the electric heating, and the fuel economy can be improved. In the present embodiment, a part of the hybrid ECU 33 that performs the control operation in Step S41 may be used as an example of the switching device. A part of the hybrid ECU 33 that performs the control operation in Step S42 may be used as an example of the first control device. A part of the hybrid ECU 33 that performs the control operation in Step S44 may be used as an example of the second control device.

Third Embodiment

In the present embodiment, in an EV mode, a fuel consumption FC1 (first fuel consumption) in the case where an engine 11 is operated in a predetermined high efficiency state is compared with a fuel consumption FC2 (second fuel consumption) in the case where the engine 11 is subjected to a running load and provides waste heat for air heating. When the fuel consumption FC1 is smaller than the second fuel consumption FC2, the operation of the engine 11 is implemented for the engine waste-heat heating in a state where the EV running (MG driving) has been implemented. When the fuel consumption FC2 is smaller than the first fuel consumption FC1, the operation of the engine 11 is executed for the engine waste-heat heating in a state where the EV running (MG driving) has been stopped.

Figure 12:
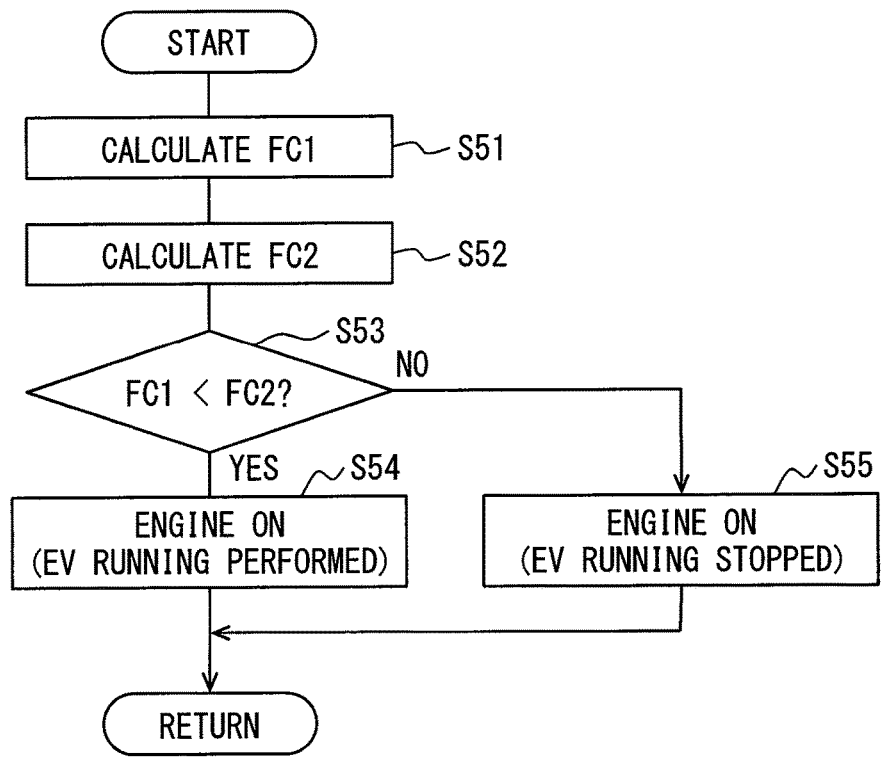
FIG. 12 is a flowchart illustrating a procedure of a waste-heat heating process in an EV mode according to a third embodiment of the present disclosure.

FIG. 12 is a flowchart illustrating a procedure of the waste-heat heating process in the EV mode, and this process is executed by a hybrid ECU 33 in place of the process of FIG. 6 described above. In other words, this processing is implemented when the engine 11 is put into an operation state and the engine waste-heat heating is implemented in spite of the EV mode.

In FIG. 12, in Step S51, a fuel consumption FC1 in the case of executing an idle operation of the engine 11 for engine waste-heat heating is calculated. In subsequent Step S52, a fuel consumption FC2 in the case of executing a running load and the waste-heat heating by the engine 11 is calculated. At that time, the fuel consumption FC1 is calculated by adding the fuel consumption of an operating point at an idle rotation speed and a fuel consumption corresponding to the power consumption for the EV running after the running load has been set to zero. Further, the fuel consumption FC2 is calculated as the fuel consumption of the operating point according to the running load and the required rotation speed each time. A part of the hybrid ECU 33 that performs the control operation in Steps S51 and S52 may be used as an example of a calculation device that calculates a first fuel consumption (FC1) which is a fuel consumption when the engine is operated in a predetermined high efficiency state and a second fuel consumption (FC2) which is a fuel consumption when the electric motor is put into a stopped state and the running load and the waste-heat heating are implemented by the engine, when the vehicle travels in the EV mode.

Thereafter, in Step S53, it is determined whether the fuel consumption FC1 is smaller than the fuel consumption FC2, or not. If FC 1<FC 2, the process proceeds to Step S54, where after the EV running has been implemented, it is determined to perform the engine operation for the engine waste-heat heating. On the other hand, if FC 1≥FC 2, the process proceeds to Step S55, where after the EV running has been stopped, it is determined to implement the engine operation for the engine travel and the waste-heat heating.

According to the above configuration, based on the estimation result of the fuel consumption, it is switched whether to perform the engine waste-heat heating with the EV running state or to perform the engine waste-heat heating with the stop of the EV running. In that case, the engine waste-heat heating in the above-described two states can be appropriately implemented taking a fuel consumption corresponding to an actual running state into consideration. In the present embodiment, a part of the hybrid ECU 33 that performs the control operation in Step S53 may be used as an example of the switching device. A part of the hybrid ECU 33 that performs the control operation in Step S54 may be used as an example of the first control device. A part of the hybrid ECU 33 that performs the control operation in Step S55 may be used as an example of the second control device.

Fourth Embodiment

In the present embodiment, in addition to the fuel consumptions FC 1 and FC 2 described above, a fuel consumption FC3 (third fuel consumption) is calculated from a power consumption when an electric heating is implemented by a heat pump device 40, and a heating process is selectively implemented according to which of the fuel consumptions FC1 to FC3 is smallest.

Figure 13:
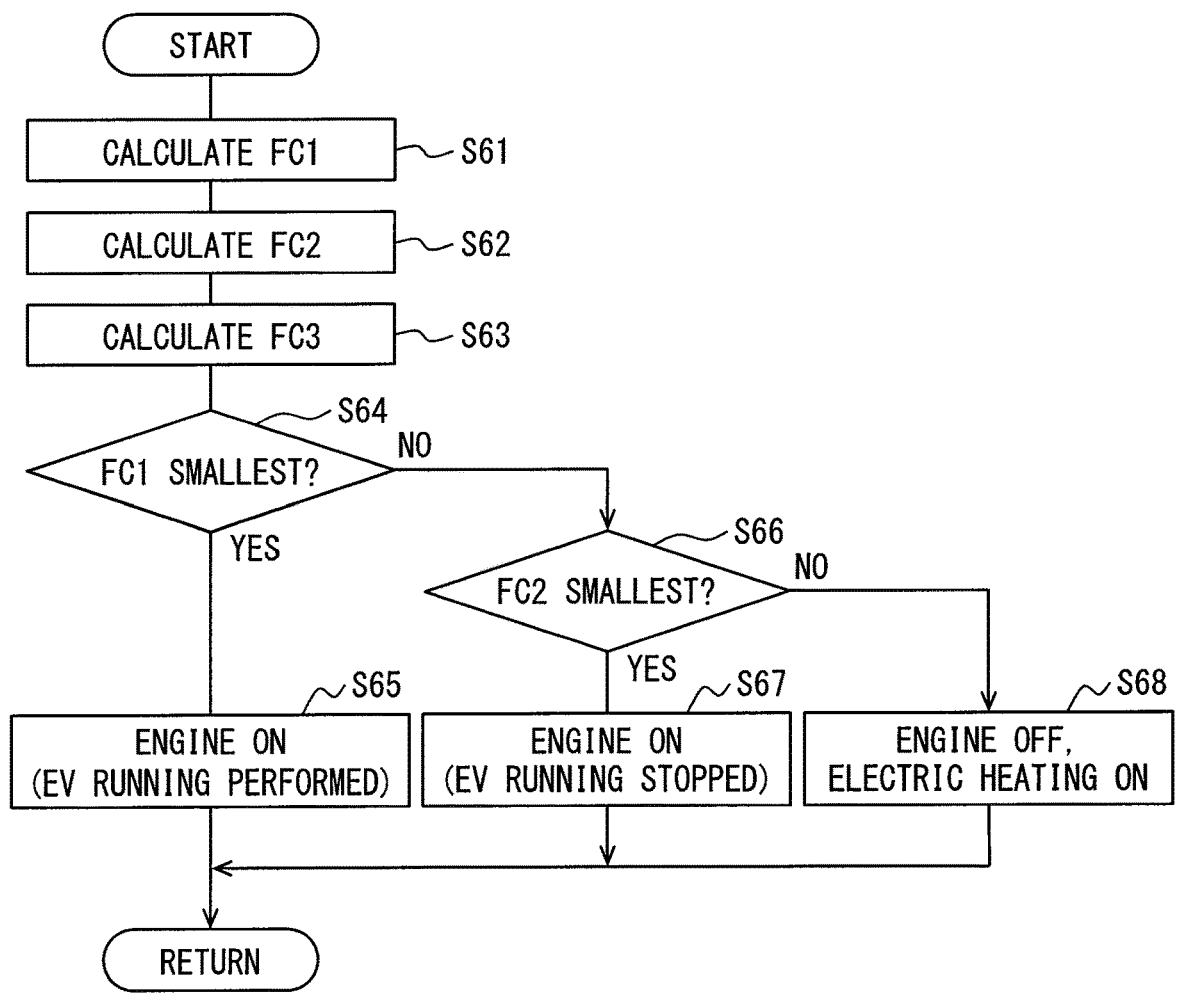
FIG. 13 is a flowchart illustrating a procedure of a waste-heat heating process in an EV mode according to a fourth embodiment of the present disclosure.

FIG. 13 is a flowchart illustrating a procedure of the waste-heat heating process in the EV mode, and this process is executed by a hybrid ECU 33 in place of the process of FIG. 6 described above. In other words, this processing is implemented when the engine 11 is put into an operation state and the engine waste-heat heating is implemented in spite of the EV mode.

In FIG. 13, in Step S61, a fuel consumption FC1 in the case of executing an idle operation of the engine 11 for engine waste-heat heating is calculated. In subsequent Step S62, a fuel consumption FC2 in the case of executing a running load and the waste-heat heating by the engine 11 is calculated. The processing in Steps S61 and S62 conforms to the processing in Steps S51 and S52 in FIG. 12.

In Step S63, the fuel consumption FC 3 in the case where the electric heating is implemented while the EV running state is maintained is calculated. For example, the fuel consumption FC3 [g] is calculated by dividing a total electric power [J] which is a sum of the EV running electric power, the water pump electric power consumption, and the heat pump electric power consumption, with a generator efficiency [%] and a lower heat generation amount [J/g] of a fuel. In this case, an insufficient heat quantity may be calculated by subtracting the stored heat quantity obtained by driving a water pump from a required heater heat quantity, and the heat pump power consumption may be calculated based on the insufficient heat quantity and the COP of the heat pump device 40. A part of the hybrid ECU 33 that performs the control operations in Steps S61, S62, and S63 may be used as an example of a calculation device that calculates a first fuel consumption (FC1) that is a fuel consumption when the engine is operated in a predetermined high efficiency state, a second fuel consumption (FC2) that is a fuel consumption when the electric motor is put into the stopped state and the running load and the waste-heat heating are executed by the engine, and a third fuel consumption (FC3) that is a fuel consumption obtained from the electric power consumption when the engine is put into the stopped state and the heating device is driven, during vehicle traveling in the EV mode.

Thereafter, in Step S64, it is determined whether the fuel consumption FC1 is the smallest of the fuel consumptions FC1 to FC3, or not. If the FC1 is the smallest and the determination in Step S64 is yes, the process proceeds to Step S65, where after the EV running has been implemented, it is determined to implement the engine operation for the engine waste-heat heating.

In addition, in Step S66, it is determined whether FC2 is the smallest of the fuel consumptions FC1 to FC3, or not. If the FC2 is the smallest and the determination in Step S66 is yes, the process proceeds to Step S67, where after the EV running has been stopped, it is determined to implement the engine operation for the engine running and the waste-heat heating. In addition, if FC3 is the smallest and the determination in step S66 is no, the process proceeds to Step S68, in which it is determined to perform the electric heating by the heat pump device 40 without driving the engine 11.

According to the above configuration, based on the estimation result of the fuel consumption, it is switched whether to perform the engine waste-heat heating with the EV running state, to perform the engine waste-heat heating with the stop of the EV running, or to perform the electric heating by the heat pump device 40 without driving the engine 11. In that case, the heating in the above-described three states can be appropriately implemented taking a fuel consumption corresponding to an actual traveling state into consideration. In the present embodiment, a part of the hybrid ECU 33 that performs the control operation in Step S64 may be used as an example of the switching device. A part of the hybrid ECU 33 that performs the control operation in Step S65 may be used as an example of the first control device. A part of the hybrid ECU 33 that performs the control operation in Step S67 may be used as an example of the second control device.

Fifth Embodiment

In the present embodiment, in the case where an engine waste-heat heating is implemented, when an engine body temperature Teng is higher than a fourth threshold (TH6), a coolant is circulated by an electric water pump 25 in a state where the engine is off. When the engine body temperature Teng is lower than the fourth threshold value, the coolant is circulated by the electric water pump 25 in a state where the engine is on.

Figure 14:
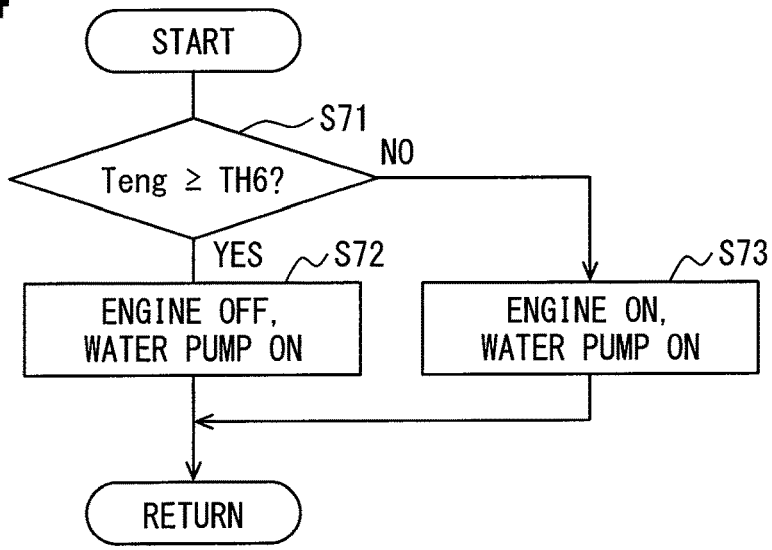
FIG. 14 is a flowchart illustrating a procedure of a waste-heat heating process in an EV mode according to a fifth embodiment of the present disclosure.

FIG. 14 is a flowchart illustrating a procedure of the waste-heat heating process in the EV mode, and this process is executed by a hybrid ECU 33 in place of the process of FIG. 6 described above. In other words, this processing is implemented when the engine 11 is put into an operation state and the engine waste-heat heating is implemented in spite of the EV mode.

In Step S71 of FIG. 14, it is determined whether the engine body temperature Teng is equal to or higher than a predetermined threshold TH6, or not. The threshold TH6 is a value higher than the threshold TH2 in Step S18 of FIG. 2. If Teng≥TH6, the process proceeds to Step S72, where it is determined to cause the electric water pump 25 to circulate the coolant in a state where the engine is off. On the other hand, if Teng<TH6, the process proceeds to Step S73, where it is determined to cause the electric water pump 25 to circulate the coolant in a state where the engine is on. In Step S73, for example, the engine 11 is driven to idle. In the present embodiment, a part of the hybrid ECU 33 that performs the control operation in Step S72 may be used as an example of a third control device that causes the electric pump to circulate a heat medium in a state where the operation of the engine stops when a body temperature acquired by the body temperature acquisition device is higher than a predetermined fourth threshold value (TH6). A part of the hybrid ECU 33 that performs the control operation in Step S73 may be used as an example of a fourth control device that causes the electric pump to circulate the heat medium in a state where the engine is operated when the body temperature is lower than the fourth threshold value (TH6).

When the engine body temperature Teng is a high temperature (TH2 or higher), it is effective to perform the engine waste-heat heating. In particular, if the engine body temperature Teng is in a high temperature range, the electric water pump 25 is drive to circulate the coolant while the engine 11 is kept stopped, thereby being capable of heating by the heater core 24. However, if the heat storage of the engine body is used too much, forcible operation of the engine 11 and the heat pump device 40 is required, which may result in a decrease in fuel efficiency rather. In this viewpoint, in the above configuration, in the case where the engine body temperature Teng is equal to or higher than TH2, if the engine body temperature Teng is equal to or higher than TH6, the engine 11 is stopped and the electric water pump 25 circulates the coolant. If the engine body temperature Teng is lower than TH6, the engine 11 is put into the operation state and the electric water pump 25 circulates the coolant. As a result, the fuel economy can be further properly improved when the engine body is in the high temperature state.

Although an electric power is consumed when the electric water pump 25 is driven, it is much smaller than the electric power consumption in the heat pump device 40. When the engine body temperature Teng is high, heat of several kW can be obtained with a low power (100 to 300 W) for driving the water pump. This corresponds to a state of high COP.

The above embodiment may be changed, for example, as follows.

Figure 15:
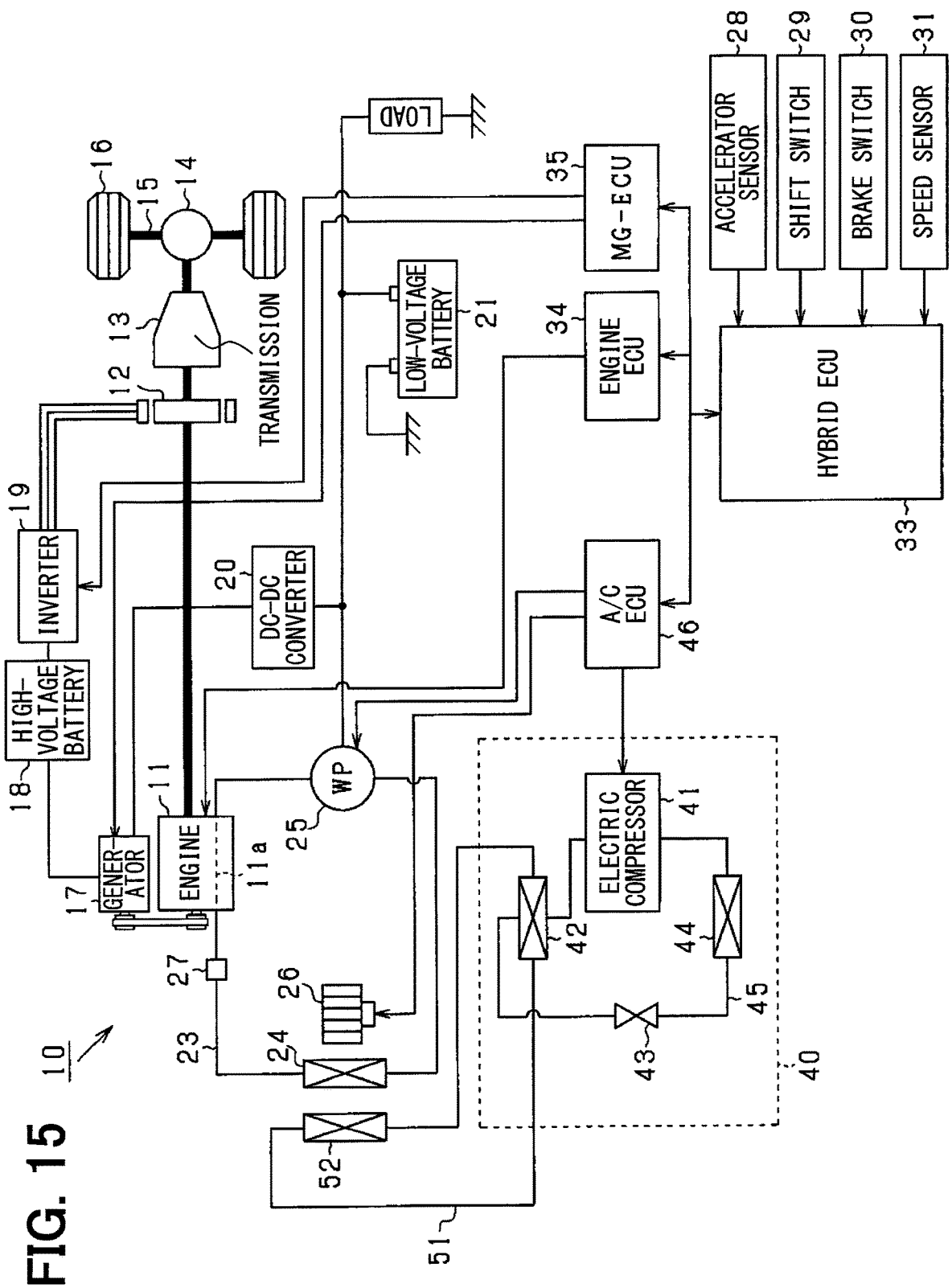
FIG. 15 is a schematic diagram illustrating a hybrid vehicle control system according to one modification of the present disclosure.
Figure 16:
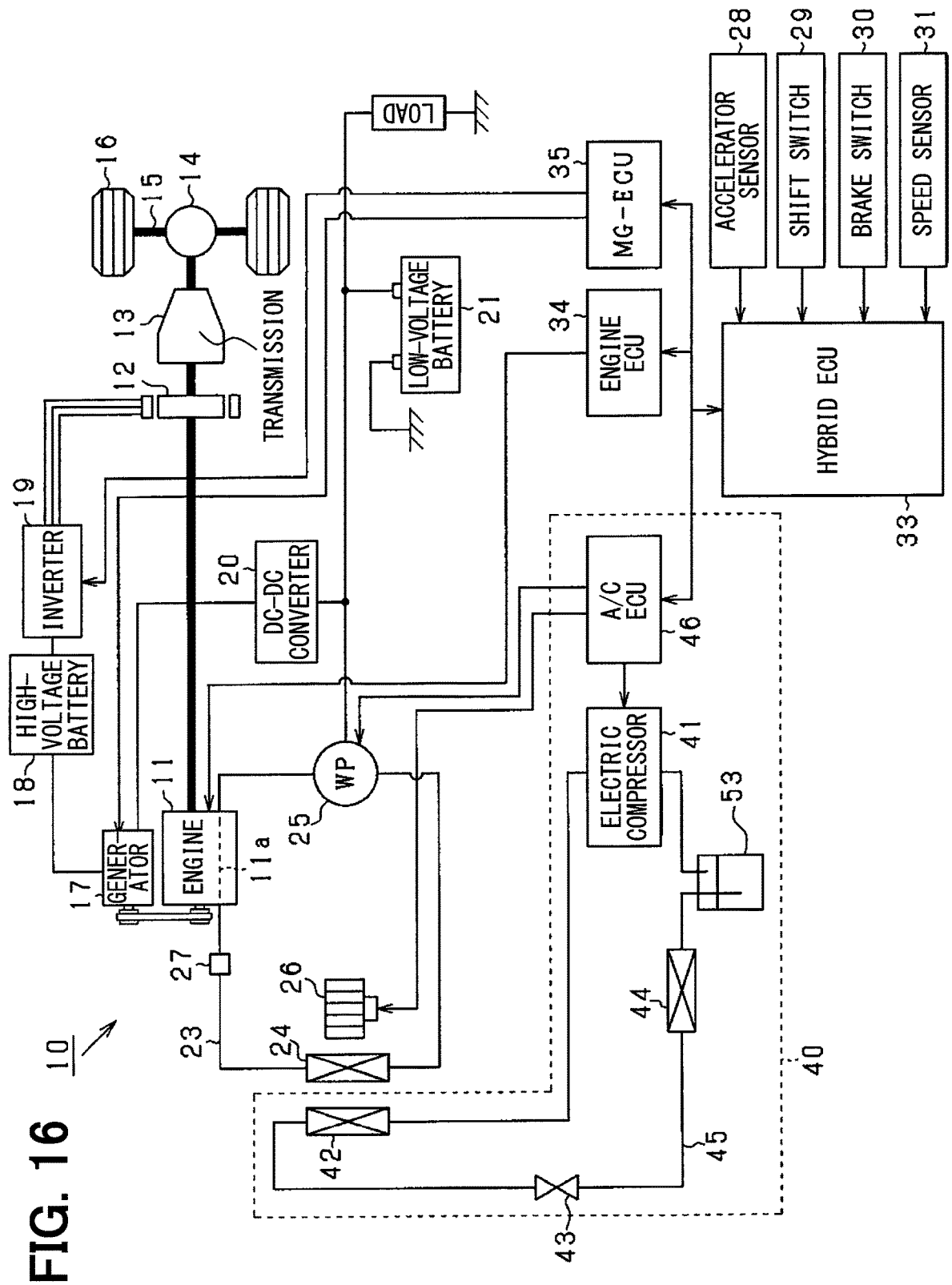
FIG. 16 is a schematic diagram illustrating a hybrid vehicle control system according to another modification of the present disclosure.

The heating system of the vehicle 10 may be configured as illustrated in FIGS. 15 and 16. In FIGS. 15 and 16, only differences from FIG. 1 will be described.

In FIG. 15, a circulation circuit 51 for circulating a heat medium (for example, engine coolant) heated by the heat of the condenser 42 of the heat pump device 40 is provided, and a heater core 52 as a heating device is provided in the circulation circuit 51. The heater core 52 is disposed at a position adjacent to the heater core 24 of the coolant circuit 23. The heater heat of the heater cores 24 and 52 is supplied to a vehicle compartment by the drive of the blower fan 26. It is preferable that an electric pump not shown is provided in the circulation circuit 51. When the water in the circulation circuit 51 is heated through the condenser 42 by the driving of the electric compressor 41, the heating by the heat release of the heater core 52 is enabled accordingly.

Further, in FIG. 16, the condenser 42 of the heat pump device 40 is disposed at a position adjacent to the heater core 24 of the coolant circuit 23, and the condenser 42 functions as a heating device. In FIG. 16, an accumulator 53 which separates a liquid refrigerant that has not been evaporated by the evaporator 44 and supplies only a gas refrigerant to the electric compressor 41 is disposed between the electric compressor 41 and the evaporator 44. The electric compressor 41 is driven, thereby being capable of performing heating by radiating heat from the condenser 42.

In the above-described embodiment, the above-described vehicle air-conditioning control is performed by the hybrid ECU 33, but the present disclosure is not limited thereto, and the above-described vehicle air-conditioning control may be executed by another ECU, for example, the A/C ECU 46.

With the use of a heater device such as a PTC heater as an electric heating device, the electric heating can be implemented by the heater device. In that case, the vehicle interior may be heated with the heater heat of the coolant by heating the coolant with the PTC heater, or the vehicle interior may be directly heated by the heater heat of the PTC heater.

The present disclosure can be applied to vehicles other than the hybrid vehicles. For example, the present disclosure can be applied to a so-called range extender type electric vehicle including a motor for vehicle traveling and an engine for power generation. In such a case, during EV running using only the power of the electric motor, the engine waste-heat heating and the electric heating may be selectively performed based on the engine body temperature.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A vehicle air-conditioning control device for a vehicle including an engine through which a heat medium is circulated and heated, a generator that is driven by the engine to generate an electric power, and an electric storage device that is charged with the electric power generated by the generator, the vehicle air-conditioning control device performing a control for air conditioning in a vehicle interior of the vehicle, the vehicle air-conditioning control device comprising an air-conditioning controller programmed to:
calculate a body temperature of the engine based on operation histories of the vehicle and the engine without using a temperature of the heat medium;
determine whether to implement an air heating in the vehicle interior by waste heat of the engine or an air heating by a heating device consuming the electric power of the electric storage device based on the calculated body temperature;
implement the air heating by the waste heat of the engine or the air heating by the heating device based on a determination result of the determination of whether to implement the air heating in the vehicle interior by the waste heat of the engine or the air heating by the heating device;
determine that the air heating by the waste heat of the engine is to be implemented when the body temperature is higher than a first threshold; and
set the first threshold by using a relationship between the body temperature of the engine and a heated rate of the heat medium by the waste heat of the engine such that the first threshold becomes a body temperature having the heated rate equivalent to a heated rate of the heat medium by the heating device.

2. The vehicle air-conditioning control device according to claim 1, wherein
the vehicle includes an electric motor that is driven as a traveling power source by the electric power of the electric storage device such that the vehicle is capable of traveling in an EV mode using only the power of the electric motor, and
the air-conditioning controller is further programmed to determine whether to implement the air heating by the waste heat of the engine or the air heating by the heating device based on the body temperature during the EV mode of vehicle traveling.

3. The vehicle air-conditioning control device according to claim 1, wherein
the vehicle is a hybrid vehicle that includes, as travel power sources, the engine and an electric motor driven by the electric power of the electric storage device, and switches between an EV mode in which the vehicle travels using the power of the electric motor without using the power of the engine and another mode in which the vehicle travels using the power of the engine, based on a running load of the vehicle and a storage state of the electric storage device, and
the air-conditioning controller is further programmed to determine whether to implement the air heating by the waste heat of the engine or the air heating by the heating device based on the body temperature during the EV mode of vehicle traveling.

4. The vehicle air-conditioning control device according to claim 2, wherein
the air-conditioning controller includes:
a first operation mode in which the electric motor is driven and the air heating is implemented by the waste heat of the engine; and
a second operation mode in which the electric motor is stopped and the air heating is implemented by the waste heat of the engine,
the air-conditioning controller is further programmed to switch between the first operation mode and the second operation mode according to a comparison between an efficiency of the heat medium heating by the first operation mode and an efficiency of the heat medium heating by the second operation mode.

5. The vehicle air-conditioning control device according to claim 4, wherein
the air-conditioning controller is further programmed to implement the first operation mode when the body temperature is higher than a second threshold, and implements the second operation mode when the body temperature is lower than the second threshold.

6. The vehicle air-conditioning control device according to claim 5, wherein the air-conditioning controller is further programmed to acquire a medium temperature which is the temperature of the heat medium, wherein the air-conditioning controller is further programmed to implement the first operation mode when the body temperature is higher than the second threshold and the medium temperature is higher than a third threshold.

7. The vehicle air-conditioning control device according to claim 4, wherein the air-conditioning controller is further programmed to operate the engine at constant speed under a predetermined high efficiency condition in the first operation mode, and the air-conditioning controller is further programmed to operate the engine to generate a power according to a running load in the second operation mode.

8. The vehicle air-conditioning control device according to claim 4, wherein the air-conditioning controller is further programmed to calculate, during the EV mode of vehicle traveling, a first fuel consumption which is a fuel consumption when the engine is operated in a predetermined high efficiency state, and a second fuel consumption which is a fuel consumption when the electric motor is stopped and the engine is subjected to the running load and provides the waste heat for the air heating, wherein the air-conditioning controller is further programmed to implement the first operation mode when the first fuel consumption is smaller than the second fuel consumption, and implements the second operation mode when the second fuel consumption is smaller than the first fuel consumption.

9. The vehicle air-conditioning control device according to claim 4, wherein the air-conditioning controller is further programmed to calculate, during the EV mode of vehicle traveling, a first fuel consumption which is a fuel consumption when the engine is operated in a predetermined high efficiency state, a second fuel consumption which is a fuel consumption when the electric motor is stopped and the engine is subjected to the running load and provides the waste heat for the air heating, and a third fuel consumption which is a fuel consumption obtained from a consumption power when the engine is stopped and the heating device is driven, wherein the air-conditioning controller is further programmed to implement the first operation mode when the first fuel consumption is smallest among the first, second and third fuel consumptions, implements the second operation mode when the second fuel consumption is smallest among the first, second and third fuel consumptions, and implements the air heating by the heating device without driving the engine when the third fuel consumption is smallest among the first, second and third fuel consumptions.

10. The vehicle air-conditioning control device according to claim 1, wherein the vehicle has a circulation circuit that circulates the heat medium by driving an electric pump, and the air-conditioning controller is further programmed to control the electric pump to circulate the heat medium in a state where the engine is stopped when the body temperature is higher than a threshold, and controls the electric pump to circulate the heat medium in a state where the engine is operated when the body temperature is lower than the threshold.

11. A vehicle air-conditioning control device for a vehicle including an engine through which a heat medium is circulated and heated, a generator that is driven by the engine to generate an electric power, and an electric storage device that is charged with the electric power generated by the generator, the vehicle air-conditioning control device performing a control for air conditioning in a vehicle interior of the vehicle, the vehicle air-conditioning control device comprising an air-conditioning controller programmed to:

calculate a body temperature of the engine based on operation histories of the vehicle and the engine without using a temperature of the heat medium;

determine whether to implement an air heating in the vehicle interior by waste heat of the engine or an air heating by a heating device consuming the electric power of the electric storage device based on the calculated body temperature; and implement the air heating by the waste heat of the engine or the air heating by the heating device based on a determination result of the determination of whether to implement the air heating in the vehicle interior by the waste heat of the engine or the air heating by the heating device, wherein:

the vehicle includes an electric motor that is driven as a traveling power source by the electric power of the electric storage device, the air-conditioning controller includes:

a first operation mode in which the electric motor is driven and the air heating is implemented by the waste heat of the engine; and a second operation mode in which the electric motor is stopped and the air heating is implemented by the waste heat of the engine, and the air-conditioning controller is further programmed to switch between the first operation mode and the second operation mode according to a comparison between an efficiency of the heat medium heating by the first operation mode and an efficiency of the heat medium heating by the second operation mode.

* * * * *